(12) United States Patent
Mannschedel

(10) Patent No.: US 11,033,358 B2
(45) Date of Patent: Jun. 15, 2021

(54) METHOD FOR PRODUCING BLANKS FOR ENDODONTIC INSTRUMENTS

(71) Applicant: COLTÈNE/WHALEDENT AG, Altstätten (CH)

(72) Inventor: Werner Mannschedel, Langenau (DE)

(73) Assignee: COLTÈNE/WHALEDENT AG, Altstaetten (CH)

( * ) Notice: Subject to any disclaimer, the term of this patent is extended or adjusted under 35 U.S.C. 154(b) by 0 days.

(21) Appl. No.: 15/465,675

(22) Filed: Mar. 22, 2017

(65) Prior Publication Data

US 2017/0189139 A1 Jul. 6, 2017

Related U.S. Application Data

(63) Continuation-in-part of application No. 15/262,067, filed on Sep. 12, 2016, now abandoned.

(30) Foreign Application Priority Data

Sep. 23, 2015 (EP) .................................... 15186457

(51) Int. Cl.
*A61C 5/42* (2017.01)
*B23H 9/08* (2006.01)
(Continued)

(52) U.S. Cl.
CPC ................. *A61C 5/42* (2017.02); *B23H 9/00* (2013.01); *B23H 9/08* (2013.01); *B24B 1/005* (2013.01);
(Continued)

(58) Field of Classification Search
CPC ...... A61C 5/42; A61C 2201/007; B23H 9/00; B23H 9/08; B24B 1/005; C23F 4/00;
(Continued)

(56) References Cited

U.S. PATENT DOCUMENTS

| 3,762,243 A | 10/1973 | Borrktield |
| 4,641,007 A | 2/1987 | Lach |

(Continued)

FOREIGN PATENT DOCUMENTS

| EP | 0076997 A1 | 4/1983 |
| EP | 3156163 A1 | 4/2017 |
| FR | 3 009 947 A1 | 3/2015 |

OTHER PUBLICATIONS

European Search Report Corresponding to 15186457.6 dated Mar. 14, 2016.
(Continued)

*Primary Examiner* — Nicholas D Lucchesi
*Assistant Examiner* — Mirayda A Aponte
(74) *Attorney, Agent, or Firm* — Finch & Maloney, PLLC; Michael J. Bujold

(57) ABSTRACT

The invention relates to a blank for an endodontic instrument, obtainable by machining at least one rod by means of wire erosion, preferably selected from the group consisting of electrical discharge machining, wire electrical discharge machining, electrical discharge grinding and electro-chemical machining, wherein an erosion pattern is applied to the at least one rod, wherein the blank has a homogenous hardness.

6 Claims, 2 Drawing Sheets

(51) Int. Cl.
  *B24B 1/00* (2006.01)
  *B23H 9/00* (2006.01)
  *B24B 19/04* (2006.01)

(52) U.S. Cl.
  CPC ........ *B24B 19/04* (2013.01); *A61C 2201/007* (2013.01)

(58) Field of Classification Search
  CPC ...... C23F 4/02; C23F 4/04; C23F 3/00; C23F 3/02; C23F 3/03; C23F 3/04; C23F 3/06; C22C 14/00; C22C 19/03
  USPC .............. 433/102; 451/149, 908; 219/69.17, 219/121.84; 427/596; 700/119
  See application file for complete search history.

(56) References Cited

U.S. PATENT DOCUMENTS

| | | | |
|---|---|---|---|
| 6,149,501 A | 11/2000 | Farzin-Nia et al. | |
| 7,207,111 B2 | 4/2007 | Aloise et al. | |
| 7,311,522 B2* | 12/2007 | Graybill | B23H 5/06 433/102 |
| 2003/0199236 A1* | 10/2003 | Aloise | B21F 7/00 451/48 |
| 2004/0171333 A1 | 9/2004 | Aloise et al. | |
| 2005/0100859 A1* | 5/2005 | Graybill | B23H 5/06 433/102 |
| 2006/0014480 A1* | 1/2006 | Aloise | B21F 99/00 451/149 |
| 2006/0185169 A1 | 8/2006 | Lewis et al. | |
| 2006/0185170 A1* | 8/2006 | Lewis | B21H 3/04 29/896.11 |
| 2016/0206401 A1* | 7/2016 | Pernot | B23H 9/008 |
| 2017/0079745 A1 | 3/2017 | Mannschedel | |

OTHER PUBLICATIONS

European Office Action issued in corresponding European patent Application No. 17 161 178.3 dated Sep. 28, 2020.

* cited by examiner

METHOD FOR PRODUCING BLANKS FOR ENDODONTIC INSTRUMENTS

The invention relates to a blank, methods for producing blanks for endodontic instruments, endodontic instruments, and a delivery device.

Dentists use various types of endodontic instruments to clean and widen root channels. The dentist typically accesses the root channel through the surface of a tooth that is to be treated. Thereafter, the root channel is cleaned and widened with endodontic instruments such as files or rasps. The root channel that has been prepared in this way is filled with a filling material by the dentist and is finally sealed.

For the working of the root channel, the dentist has access to a range of flexible files that each have a handle. The files have different diameters for cleaning and widening the root canal successively. Along the length of the endodontic instrument there are typically helical and non-helical grooves or channels and cutting edges which ensure a cutting action.

Conventional endodontic instruments are produced by means of a bar being continuously twisted. In this way, cutting edges form on the surface. Alternatively, endodontic instruments are produced by means of a rod being machined in a rotating grinder. In this way, helical and non-helical grooves or notches and cutting edges are introduced along the length of the instrument. Said methods are time-consuming and cost-intensive, and only a limited number of surface configurations can be produced.

U.S. Pat. No. 6,149,501 describes a method for producing superelastic endodontic instruments, wherein a blank is present in the austenite phase of the material before being twisted. The material changes to the martensite phase during the twisting. The method comprises work steps carried out at high temperature and in liquids, which also have corroding effects on the material. The method is therefore associated with a number of disadvantages.

U.S. Pat. No. 7,207,111 B2 describes methods for producing endodontic instruments, wherein helical grooves or notches and cutting edges are formed by twisting at low temperature. Grooves or notches and cutting edges can also be introduced into the endodontic instrument by means of electrical discharge machining (EDM). Eroded material deposits again onto the instrument and has a hardness that is at least 15% greater than the hardness of the starting material. This has proven mechanically disadvantageous during the use of the instrument.

An object of the invention is to overcome the disadvantages of the prior art. In particular, it is an object of the invention to provide a blank for the production of an endodontic instruments and methods for producing blanks for endodontic instruments, by which methods the blanks can be produced rapidly and cost-effectively and with advantageous properties in terms of stability and functionality.

This object is solved by the features of the independent claims.

The invention relates to a blank for an endodontic instrument. The blank is obtained by a method, wherein material is removed from a rod by an erosion method, preferably a method selected from the group consisting of electrical discharge machining, wire electrical discharge machining, electrical discharge grinding and electro-chemical machining, to form a plurality of cutting edges and flutes having a non-directional surface finish. The blank has a substantially homogenous hardness over the cross-section of the blank. This blank is obtainable by a method as explained in the following. In this way, a blank is made available which is produced cost-effectively and which has the abovementioned advantages.

The invention relates to a method for producing above blanks for endodontic instruments. The method comprises the step of providing at least one rod. The method further comprises the step of machining the at least one rod by means of erosion, preferably selected from the group consisting of electrical discharge machining, wire electrical discharge machining, electrical discharge grinding and electro-chemical machining, wherein an erosion pattern is applied to the at least one rod. During the machining by means of erosion, preferably selected from the group consisting of electrical discharge machining, wire electrical discharge machining, electrical discharge grinding and electro-chemical machining, material is eroded away from the rod. Thus, a pattern with edges, in particular cutting edges, can be generated on the at least one rod, which pattern permits the mechanical working of a root canal. In erosion methods like wire erosion, the material eroded away from the at least one rod at least partially deposits again as a layer on the at least one rod. The layer of the re-deposited material has a surface hardness which substantially corresponds to the hardness of the material of the at least one rod.

A further aspect of the invention relates to a method for producing aforementioned blanks for endodontic instruments. The method comprises the step of providing at least one rod. The at least one rod is machined by means of erosion, e.g. wire erosion, preferably selected from the group consisting of electrical discharge machining, wire electrical discharge machining, electrical discharge grinding and electro-chemical machining, wherein an erosion pattern is applied to the at least one rod. The material, which is eroded away from the at least one rod, at least partially deposits again as a layer on the at least one rod. The method further comprises the step of removing substantially all of said re-deposited layer from the at least one rod.

The machining step may be designed such that the strength of the connection between the at least one rod and the material that has been redeposited during wire erosion is adjusted.

Removal of the layer of re-deposited material is preferably performed by means of at least one of electropolishing, chemical polishing, mechanical polishing, magnetic abrasive polishing, electrochemical polishing, and combinations thereof.

The strength of the connection between the layer of the re-deposited material and the material of the at least one rod may be adjusted. Preferably, the strength of the connection is chosen such that the layer of re-deposited material is easily removed by at least one of the aforementioned means for removing the layer of re-deposited material; in other words, the connection is preferably rather weak.

The strength of the connection between the layer of the re-deposited material and the material of the at least one rod may be adjusted by the conditions of the machining by erosion. In particular, the strength of the connection between the layer of the re-deposited material and the material of the at least one rod can be adjusted by the atmosphere of the environment, particularly by the liquid of the erosion bath or the composition of the liquid of the erosion bath.

The surface hardness of a layer obtained by erosion can be adjusted by routine measures involving suitable selection of the method parameters. In particular, the surface hardness of a layer obtained by erosion can be adjusted by the liquid of the erosion bath. The liquid of the erosion bath can comprise deionized water or oils, in particular mineral oils, high molecular weight hydrocarbons, silicone oils, synthetic or natural esters. Common liquids of the erosion bath, and compositions of the liquid of the erosion bath, are known to a person skilled in the art.

In this way, blanks are produced in a cost-efficient and time-efficient manner. It is particularly advantageous that, in the finished endodontic instrument, the layer of the re-deposited material does not tend to crack under mechanical stress, for example during the working of a root canal. It has surprisingly been found that, contrary to the teaching of the prior art, a substantially identical hardness between the material of the rod and the layer of deposited material is particularly advantageous in this respect. Moreover, on account of the more uniform hardness (in cross section) of the blank, it is possible to obtain a very homogeneous bending behavior and particularly homogeneous elastic properties.

A further aspect of the invention relates to a method for producing above blanks for endodontic instruments. The method comprises the steps of providing at least one rod and machining the at least one rod by means of erosion such as wire erosion, preferably selected from the group consisting of electrical discharge machining, wire electrical discharge machining, electrical discharge grinding and electro-chemical machining. An erosion pattern is applied to the at least one rod during the wire erosion process. The material, which is eroded away from the at least one rod, does not deposit again on the at least one rod. Thus, the at least one rod does not comprise a layer of re-deposited material.

The eroded material may be substantially removed, e.g. by suctioning, before the eroded material re-deposits on the rod during the machining by erosion. This may for instance be achieved by a flowing dielectric medium, and/or a combination of ultrasonic machining and EDM machining. Furthermore, adjustments in current and pulstime and also powder additives are influencing the rate of redeposition of the eroded material.

Preferably, the rod or rods rods used for the above methods have a length in the range of 1 to 15 m, more preferably 2 to 10 m, particularly preferably 3 to 4 m.

The rod or rods used can also be hollow rods (tubes). In the finished endodontic instrument, liquid, in particular flushing liquid, can in this way be introduced centrally into the root channel. (Dieser Absatz findet sick später in den Claims nicht meter wieder, ist das Absicht?

The material of the rods can be chosen from the following materials: α-titanium alloys; β-titanium alloys; α,β-titanium alloys; nickel-titanium alloys, in particular stoichiometric NiTi alloys or approximately equiatomic NiTi alloys, for example 50.8% Ti/49.2% Ni, 46% Ti/54% Ni. NiTi alloys can also contain additives chosen from the group consisting of niobium, copper, chromium, cobalt, hafnium, vanadium and palladium. A proportion of at least 40 atomic percent Ti is in any case preferred. With materials of this kind, both the blank and the finished endodontic instrument have super-elastic properties.

The layer of the re-deposited material can have a surface hardness which is substantially 0 to 15%, preferably 0 to 8%, particularly preferably 0 to 5% harder than the hardness of the material of the at least one rod.

In the context of the invention, the surface hardness is determined in particular by the nanoindentation method. Here, an indenter is pressed with a certain force into the material. The remnant depth ratio (RDR) is used for the evaluation. This describes the ratio of the remaining penetration depth $h_{ver}$ to the maximum penetration depth $h_{max}$:

$$RDR = \frac{h_{ver}}{h_{max}}$$

In the machining by means of erosion, preferably selected from the group consisting of electrical discharge machining, wire electrical discharge machining, electrical discharge grinding and electro-chemical machining, at least one further erosion pattern can be applied to the at least one rod. The at least one further erosion pattern is here designed such that it generates a different effect, in particular a different cutting effect, than the first erosion pattern during the intended use of the endodontic instrument. The second erosion pattern can in particular be configured reciprocally to the first erosion pattern. Accordingly, the first erosion pattern or the cutting edges thereof perform(s) a cutting function upon insertion into a root canal, and the second erosion pattern or the cutting edges thereof perform(s) a cutting function upon removal from a root channel, i.e. during the movement in the opposite direction. The root channel is efficiently cleaned and widened in this way. In particular, for example, two or three edges, in particular cutting edges, can be provided which perform a cutting action during the advance movement, i.e. upon insertion into the root channel, and one edge, in particular one cutting edge, which performs a cutting action during the reverse movement. In this way, the instrument is subject to less mechanical stress during the reverse movement. Of course, other numbers of edges, in particular of cutting edges, are also conceivable.

Advantageously, several rods can be eroded simultaneously in the above methods. In this way, the production process is accelerated and the production costs are lowered.

After the step of machining the one or more rods by means of erosion, in which step an erosion pattern is applied to the one or more rods, or after the step of removing the layer of re-deposited material a secondary treatment of the one or more rods can take place. This can be done by electropolishing, chemical polishing, heat treatment for adjusting the elasticity and/or hardness, or application of a coating, in particular comprising diamond-like carbon (DLC) and/or boron nitride. The aforementioned secondary treatments can be carried out individually or in combination. In principle, any type of secondary treatment can be used that leads to a change in the properties of the blank, in particular of the cutting edges of the blank.

Of course, the one or more rods can also be pre-treated before being supplied for the method. Typical pre-treatments of the one or more rods serve to clean and/or inactivate the surface. In this way, it is possible to improve the deposition of the eroded material in the method according to the invention onto the one or more rods.

After the step of machining the one or more rods by erosion, in which step an erosion pattern is applied to the one or more rods, or after the step of removing the layer of re-deposited material the at least one rod or the several rods can be cut into lengths. In this way, the blank is brought to the length required for the intended use and is further processed to give an endodontic instrument. In the simplest case, the further processing can simply entail the attachment of a handle. More extensive machining (for example twisting) of the actual endodontic active region is no longer necessary, as a result of which the method is considerably simplified.

A further aspect of the invention concerns a blank for an endodontic instrument. This blank is obtainable by one of the methods as explained above. In this way, a blank is made available which is produced cost-effectively and which has the abovementioned advantages.

The invention further relates to an endodontic instrument which can be produced from a blank as described above. The endodontic instrument moreover has an attachment device (for example for a mechanical retainer for appliances or machines) and/or a holding device, in particular a handle. The endodontic instrument is mechanically more stable than conventional endodontic instruments. In particular, the re-deposited layer surprisingly does not tend to crack, on account of the material hardness being substantially identical with the body of the instrument. This applies of course to the intended use of the endodontic instrument, for example in the context of root treatment. The attachment device and/or holding device, in particular the handle, allow the instrument to be attached to a device for example during a root treatment and/or allow the instrument to be gripped by hand.

A further aspect of the invention concerns a delivery device, which is designed in such a way that several rods can be delivered simultaneously or in succession into an erosion device for carrying out a method as explained above. Advantageously, the delivery device, in combination with a device for the erosion, permits the introduction of one or more erosion patterns on several rods. In this way, the above-described advantages can be achieved particularly easily and efficiently.

In the delivery device, the rods can be rotated in particular through 360° and more (in particular integer multiples thereof) about the longitudinal axis of the rods. Changing the directions of rotation is also possible, in order to bring about special (e.g. contradirectional) erosion patterns.

The invention is explained below with reference to the FIGS. 1 and 2 and on the basis of measurement results.

Figure 1:
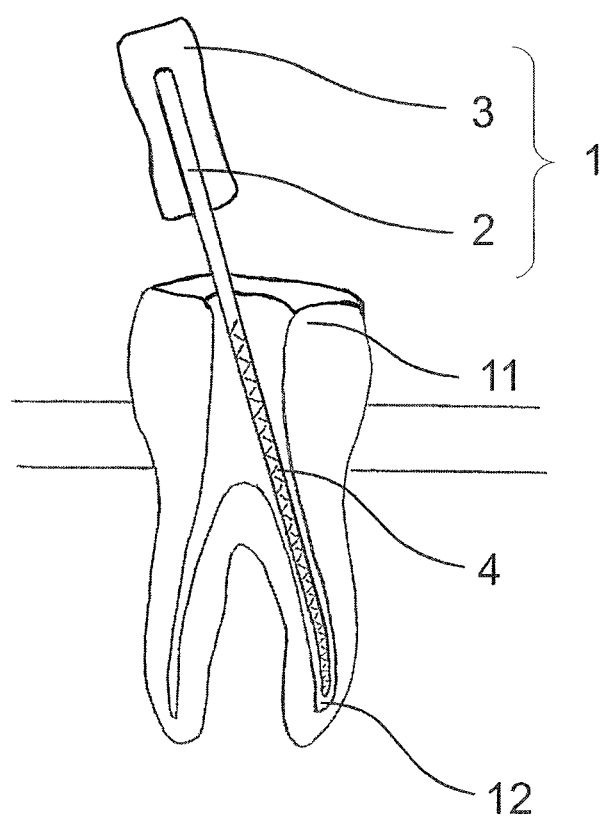
FIG. 1 shows a schematic view of an endodontic instrument in the root canal of a tooth.

FIG. 1 shows an endodontic instrument 1 during the treatment of a molar 11. Here, the endodontic instrument 1 is partially inserted into a root channel 12 of the tooth 11. By means of movements of rotation and translation, the root canal 12 is cleaned, i.e. the dentin removed from the root canal 12, and widened. The endodontic instrument 1 comprises a handle 3 and a body 2. The body 2 is produced from a nickel-titanium alloy and has at least one erosion pattern 4. The erosion pattern 4 was introduced in a wire erosion method. The erosion pattern 4 is formed here, inter alia, by the deposition of eroded material. The erosion pattern 4 has cutting edges, which perform a cutting function during the intended use.

Figure 2:
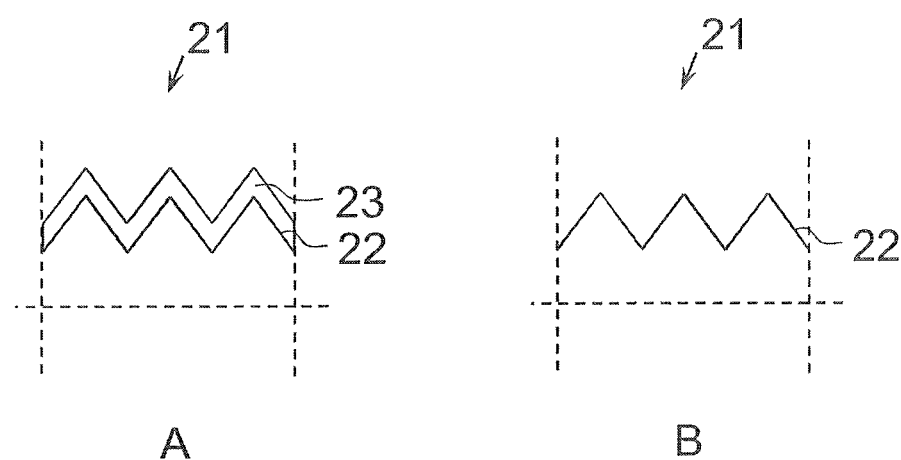
FIG. 2 shows a schematic view of a section of a blank.

FIG. 2 shows a schematic view of a section of a blank 21. The blank 21 has a surface pattern 22, which was formed in a machining process by wire erosion. The surface of the blank 21 comprises a layer of re-deposited material 23, which was formed by material eroded away from the blank 21 and deposited on the blank 21 during the machining by wire erosion (FIG. 2, ref. A).

The layer of re-deposited material 23 may be removed resulting in a blank having a surface pattern 22 and lacking a layer of re-deposited material (FIG. 2, ref. B). Alternatively, no material, which is eroded away from the blank 21, is deposited on the blank 21 during the machining by wire erosion. The latter also results in a blank as shown in FIG. 2, ref. B.

The hardness of the instruments was defined by the nanoindentation method (maximum forces 10 mN and 30 mN). The remnant depth ratio (RDR) was determined for the evaluation, likewise $h_{max}$, $h_{ver}$ and the elastic modulus. In workpieces according to the invention, no significant difference in hardness could be identified between areas treated by EDM and areas not treated by EDM. In the endodontic application, instruments according to the invention showed excellent and homogeneous properties of bending and elasticity, without any cracking of surface material, even under intensive and prolonged stress.

The invention claimed is:

1. A blank for an endodontic instrument, the blank comprising:
   a rod having material removed therefrom by erosion, a portion of material eroded away from the rod, during the erosion, is redeposited on the rod to form cutting edges, which have a non-directional surface finish, and, following manufacturing, the blank for producing the endodontic instrument has a substantial homogenous hardness, the blank for producing the endodontic instrument being manufactured by the method of:
   selecting the erosion from the group consisting of electrical discharge machining, wire electrical discharge machining, electrical discharge grinding and electrochemical machining, and
   at least partially depositing the material, eroded away from the rod during the erosion, as a layer on the rod to form a plurality of cutting edges and flutes which have a non-directional surface finish, and
   wherein the blank has the substantial homogenous hardness over the cross-section of the blank such that a maximum hardness of any portion of the cross-section of the blank, measured by a nanoindentation method, is less than 8% greater than a minimum hardness of any other portion of the cross-section of the blank, measured by the nanoindentation method.

2. The blank according to claim 1, wherein the rod is hollow.

3. The blank according to claim 1, wherein the rod is chosen from the group consisting of α-titanium alloys, β-titanium alloys, α,β-titanium alloys, nickel-titanium alloys.

4. The blank according to claim 1, wherein the rod is a stoichiometric NiTi alloy.

5. The blank according to claim 1, wherein the rod is an equiatomic NiTi alloy.

6. An endodontic instrument blank, the endodontic instrument blank comprising:
   a rod having material removed therefrom during an erosion, a portion of material, eroded away from the rod during the erosion, is redeposited back on the rod to form a plurality of cutting edges which have a non-directional surface finish, and, following the manufacturing process, the endodontic instrument blank has a substantial homogenous hardness, the endodontic instrument blank being manufactured by the process of:
   using one of electrical discharge machining, wire electrical discharge machining, electrical discharge grinding and electrochemical machining as the erosion for removing material from a surface of the rod,
   depositing at least a portion of the material, eroded away from the rod during the erosion, back onto the surface of the rod as a layer to form the plurality of cutting edges and flutes, which have the non-directional surface finish, designed for removing dentin from a root canal,
   wherein, following manufacture, the endodontic instrument blank has the substantial homogenous hardness over a cross-section of the endodontic instrument blank such that a maximum hardness of any portion of the cross-section of the endodontic instrument blank, when measured by a nanoindentation method, is less than 8% greater than a minimum hardness of any other portion of the cross-section of the endodontic instrument blank, measured by the nanoindentation method.

* * * * *